(12) United States Patent
Miyazaki

(10) Patent No.: US 7,620,372 B2
(45) Date of Patent: Nov. 17, 2009

(54) COMMUNICATION DEVICE, METHOD FOR CONTROLLING COMMUNICATION, GAME MACHINE, AND GAME SYSTEM

(75) Inventor: Yoshio Miyazaki, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 515 days.

(21) Appl. No.: 10/983,212

(22) Filed: Nov. 5, 2004

(65) Prior Publication Data
US 2005/0122948 A1    Jun. 9, 2005

(30) Foreign Application Priority Data
Nov. 6, 2003    (JP)    ............... 2003-377396

(51) Int. Cl.
*H04B 1/38* (2006.01)

(52) U.S. Cl. ............ 455/73; 455/74; 455/63.1; 455/66.1; 455/426.1; 455/552; 455/466; 455/46; 455/42; 375/346; 375/347

(58) Field of Classification Search ............ 455/41.2, 455/39, 42, 44, 552.1; 370/350, 346, 336, 370/336 A
See application file for complete search history.

(56) References Cited

U.S. PATENT DOCUMENTS 6,684,062 B1 *    1/2004    Gosior et al.    ............ 455/73

2005/0064818 A1 *    3/2005    Assarsson et al.    ............ 455/41.2
2006/0111187 A1 *    5/2006    Miyazaki    ............ 463/40
2006/0195522 A1 *    8/2006    Miyazaki    ............ 709/204

FOREIGN PATENT DOCUMENTS

| JP | 9 191302 | 7/1997 |
|----|----------|--------|
| JP | 10 256948 | 9/1998 |
| JP | 2001-36580 | 2/2001 |
| JP | 2001 190842 | 7/2001 |
| JP | 2003 298596 | 10/2003 |

\* cited by examiner

*Primary Examiner*—Charles N Appiah
*Assistant Examiner*—Randy Peaches
(74) *Attorney, Agent, or Firm*—Frommer Lawrence & Haug LLP; William S. Frommer; Thomas F. Presson

(57) ABSTRACT

A technology for realizing real-time frequency hopping in an environment containing a plurality of masters. A game machine includes a plurality of communication modules which carry out the frequency hopping, and a control section which controls communication by the communication modules. The control section controls the frequency hopping of at least one communication module to prevent frequency channels used by the plurality of communication modules from temporally overlapping. As a method for achieving the control, for example, a frequency band may be divided, and a divided frequency band may be assigned to each communication module. Alternatively, each communication module may use the same reference hopping pattern by shifting its phase, or may use the reference hopping pattern by adding a predetermined offset.

10 Claims, 7 Drawing Sheets

FIG.7A

MASTER A

| SPREAD SPECTRUM CODE \ TIME | t1 | t2 | t3 | t4 | t5 | t6 | t7 |
|---|---|---|---|---|---|---|---|
| THIRD BIT | 1 | 0 | 1 | 1 | 0 | 1 | 0 |
| SECOND BIT | 0 | 1 | 1 | 0 | 1 | 0 | 1 |
| FIRST BIT | 1 | 1 | 0 | 1 | 0 | 1 | 0 |
| FREQUENCY CHANNEL | 5 | 3 | 6 | 5 | 2 | 5 | 2 |

FIG.7B

MASTER B

| SPREAD SPECTRUM CODE \ TIME | t1 | t2 | t3 | t4 | t5 | t6 | t7 |
|---|---|---|---|---|---|---|---|
| THIRD BIT | 0 | 1 | 0 | 0 | 1 | 0 | 1 |
| SECOND BIT | 1 | 0 | 0 | 1 | 0 | 1 | 0 |
| FIRST BIT | 0 | 0 | 1 | 0 | 1 | 0 | 1 |
| FREQUENCY CHANNEL | 2 | 4 | 1 | 2 | 5 | 2 | 5 |

COMMUNICATION DEVICE, METHOD FOR CONTROLLING COMMUNICATION, GAME MACHINE, AND GAME SYSTEM

BACKGROUND OF THE INVENTION

1. Field of the Invention

The present invention relates to a communication technology, and in particular relates to a technology for realizing wireless communication between a master and a slave by frequency hopping spread spectrum.

2. Description of the Related Art

A game machine and a controller for the game machine operated by a user were generally connected via a cable, but a system for establishing a radio channel between the game machine and the controller has been proposed in recent years. By using a wireless controller, a user can enjoy a game in free posture.

The conventionally proposed system is on the precondition that a wireless communication device provided in the game machine is wireless connected to the wireless controller via one-to-one radio connection and a connection partner is uniquely decided. Thus, when a plurality of users use the wireless controllers, it is necessary to provide the dedicated communication devices, each of which is assigned to each wireless controller, in the game machine on a per-wireless controller basis. Accordingly, the user has to always prepare the wireless controller and the wireless communication device for connecting the wireless controller to the game machine in a pair, so that the use of the wireless controller is troublesome.

Frequency hopping spread spectrum is one of methods for realizing wireless communication. The frequency hopping spread spectrum is a spectrum spread communication method, in which a wide frequency band is divided into plural to set channels, and communication is carried out by switching the channels. In Japan, Bluetooth has 79 channels, which are set in a wide band of 2.4 GHz (2402 to 2480 MHz) every 1 MHz, and communication is carried out by switching the channels for 1600 times per second. When a transmission error occurs due to the collision of signals using the same frequency, the same data is retransmitted after hopping to another frequency.

As types of collision of a Bluetooth signal, collision with a signal on IEEE802.11b standards, collision with noise emitted from a microwave oven, collision with noise existing in the same frequency band as the Bluetooth and the like are supposed. In the case where a plurality of masters form piconets whose signal communication ranges are overlapped mutually, collision between the Bluetooth signals is also supposed. A hopping pattern is uniquely determined in each piconet, and hence the probability of the collision between the Bluetooth signals is not high. A Bluetooth communication system, however, is built upon a principle that communication quality is maintained by retransmitting the signal, even if the collision occurs. When there are two piconets in the same area, the probability of the occurrence of interference between the piconets is one in 79.

In the game system, when the wireless communication between the game machine and a plurality of wireless controllers is realized by the frequency hopping spread spectrum, it is necessary to consider latency, that is, delay in the transmission of data. Particularly, in a game much requiring real-time communication such as a fighting game, it is necessary to minimize communication delay. If the latency becomes worse, the game application cannot be operated well. Therefore, when the frequency hopping spread spectrum is used in communication environment which requires real-time communication, controlling the system to avoid an transmission error is better than controlling the system to retransmit data when the transmission error occurs due to the collision of signals.

SUMMARY OF THE INVENTION

To solve the foregoing problems, an aspect of the present invention provides a communication device. The communication device comprises a plurality of masters capable of wireless connecting to a slave by frequency hopping spread spectrum and a control section which controls frequency hopping of at least one of the masters. The master is a device which controls communication, and the slave is a device to be controlled.

Another aspect of the present invention provides a communication device. The communication device comprises an attachment section which attaches at least one master which is capable of wireless connecting to a slave by frequency hopping spread spectrum and a control section which controls frequency hopping of at least one of the masters, in a state that the at least one master is attached to the attachment section.

Further another aspect of the present invention provides a game machine. The game machine comprises a plurality of communication modules capable of wireless connecting to wireless controllers by frequency hopping spread spectrum and a control section which controls frequency hopping of at least one of the communication modules.

Further another aspect of the present invention provides a game system including a game machine and wireless controllers for the game machine. The game machine comprises a plurality of communication modules capable of wireless connecting to the wireless controllers by frequency hopping spread spectrum and a control section which controls frequency hopping of at least one of the communication modules.

Further another aspect of the present invention provides a game system including a game machine and wireless controllers for the game machine. The game machine comprises an attachment section which attaches at least one communication module which is capable of wireless connecting to the wireless controllers by frequency hopping spread spectrum and a control section which controls frequency hopping of at least one of the communication modules, in a state that the at least one communication module is attached to the attachment section.

Further another aspect of the present invention provides a method for controlling communication which realizes communication between a master and a slave in an environment where there are a plurality of masters communicating by use of frequency hopping spread spectrum, the method comprising controlling frequency hopping of at least one of the masters so that collision probability of signals is lower than that in a case where the plurality of the masters carry out frequency hopping without being controlled.

Further another aspect of the present invention provides a program for making a computer, which controls a plurality of masters communicating by use of frequency hopping spread spectrum, execute the function of determining a hopping frequency channel of at least one of the masters so that collision probability of signals is lower than that in a case where the plurality of masters carry out frequency hopping without being controlled.

It should be noted that applicable aspects of the present invention also include any combinations of the foregoing components, as well as ones in which the components and expressions of the present invention are replaced among methods, apparatuses, systems, recording media, computer programs, etc.

BRIEF DESCRIPTION OF THE DRAWINGS

FIGS. 7A and 7B are tables showing frequency channels of two masters, when bits of them are inverted.

DETAILED DESCRIPTION OF THE INVENTION

This embodiment aims to provide a communication technology for preventing or reducing interference between signals in using frequency hopping spread spectrum.

Figure 1:
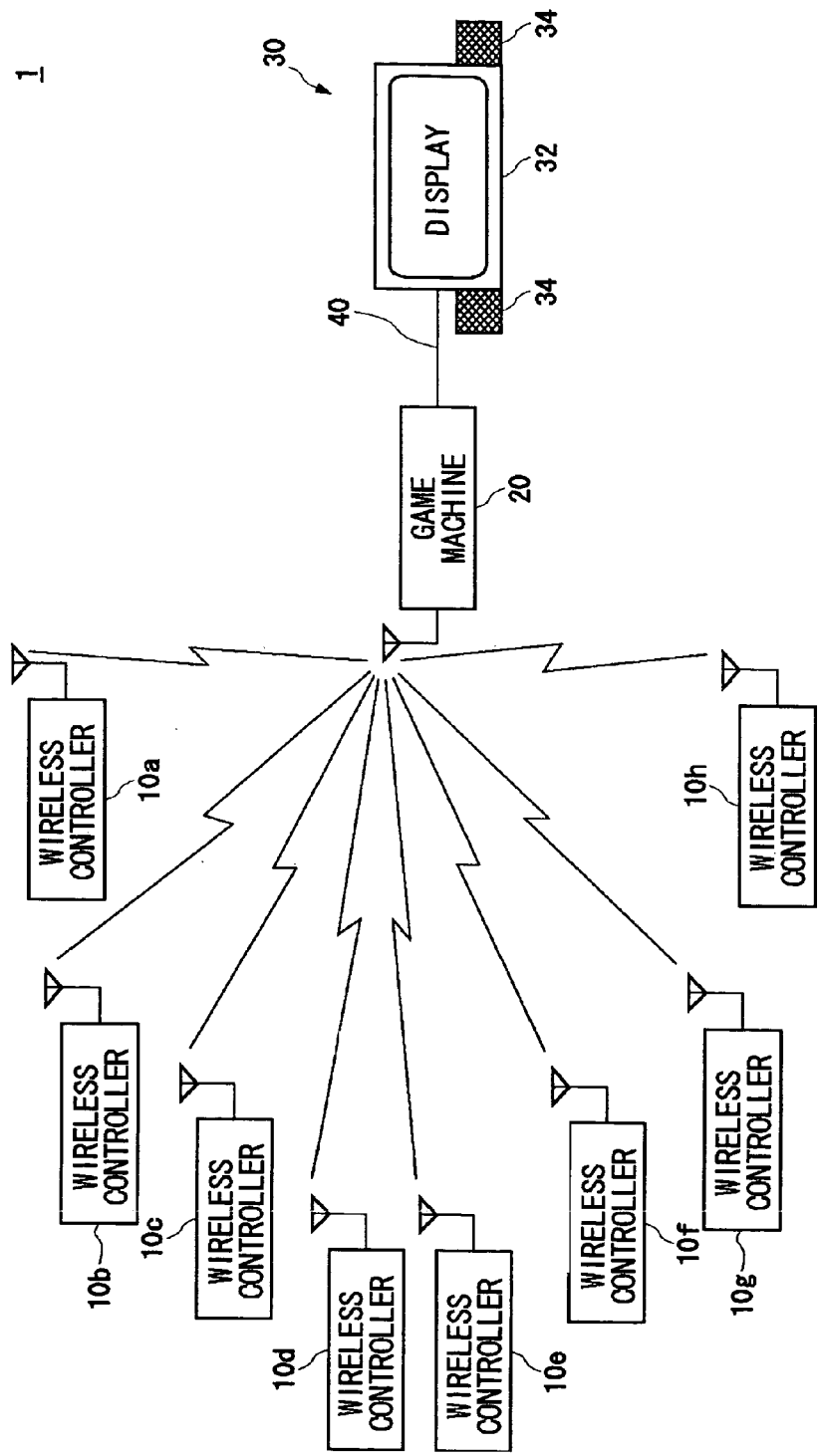
FIG. 1 is a drawing showing the entire configuration of a game system according to an embodiment.

FIG. 1 shows the entire configuration of a game system 1 according to this embodiment of the present invention. The game system 1 has the function of a communication system which realizes wireless communication between a master and a slave. The game system 1 according to this embodiment comprises wireless controllers 10a, 10b, 10c, 10d, 10e, 10f, 10g, and 10h (hereinafter called "wireless controllers 10," if they are collectively called), which carry out wireless communication with a game machine 20 as input interfaces from users. The eight wireless controllers 10 are illustrated in the drawing, but the number of the wireless controllers 10 is not limited to this. The number of the wireless controllers 10 may be seven or less, or may be nine or more. The game machine 20 is a communication device having a wireless communication function. The wireless controller 10 is a terminal device having a wireless communication function. The wireless controller 10 communicates with the game machine 20. The game machine 20 generates AV (audio visual) data of a game in accordance with game operation commands from the users, which are transmitted through the wireless controllers 10. An output device 30 including a display 32 and a speaker 34 receives the AV data of the game from the game machine 20 through a network 40 to display game images in the display 32 and output game sound from the speaker 34. In the game system 1, it is necessary to carry out at least one communication per 1/60 second between the game machine 20 and the wireless controller 10 in a normal processing mode, that is a round trip is realized within 1/60 second, in accordance with relations with a frame rate of the display 32.

The game machine 20 may be connected to the output device 30 via a cable, or may be wireless connected thereto. The network 40 for connecting the game machine 20 and the output device 30 may take the form of a home network, which is composed of, for example, a network (LAN) cable, a wireless LAN, or the like. When the game machine 20 is wireless connected to the output device 30, it is possible to relatively freely set up the game machine 20 and the output device 30, as compared with a case where the game machine 20 is connected to the output device 30 via the cable or the like. Therefore, the users can enjoy the game location-free.

The wireless controllers 10 are wireless connected to the game machine 20 by the frequency hopping spread spectrum. As a communication protocol which adopts the frequency hopping spread spectrum, there is, for example, Bluetooth. The game machine 20 is capable of wireless connecting to the plurality of wireless controllers 10. In other words, the game system 1 realizes 1-to-N communication between the game machine 20 and the wireless controllers 10. The game machine 20 according to this embodiment comprises a plurality of communication modules and a control section which controls communication by the plurality of communication modules. Each of the plurality of communication modules has the function of connecting with the plurality of wireless controllers 10. In the game system 1, the communication module provided in the game machine 20 functions as a host machine, that is, a master, and the wireless controller 10 functions as a slave.

Figure 2:
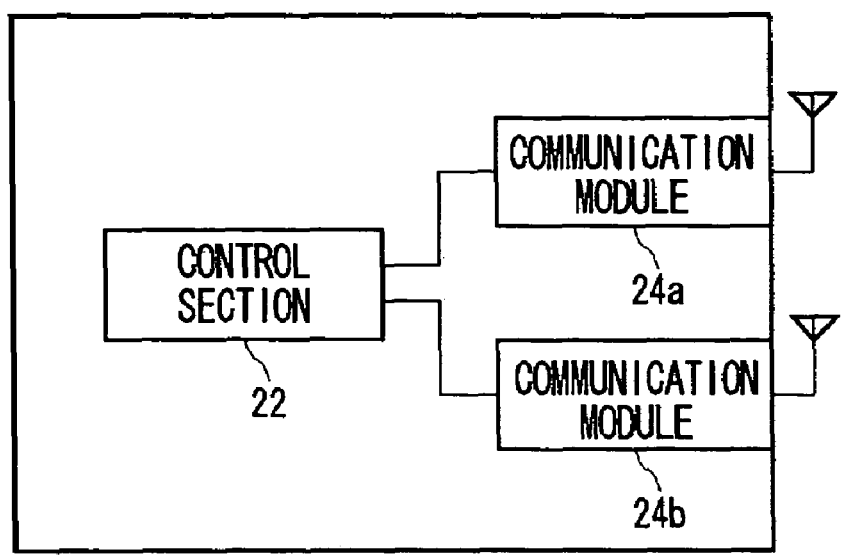
FIG. 2 is a drawing showing the configuration for realizing the communication function of a game machine.

FIG. 2 shows structure for realizing the communication function of the game machine 20. The game machine 20 comprises communication modules 24a and 24b (hereinafter called "communication modules 24" if they are collectively called) which are capable of wireless connecting to the slaves, and a control section 22 which controls the communication function of communication modules 24 which transmit and receive information signals. The game machine 20 may be provided with three or more communication modules 24.

The communication function according to this embodiment is realized in the game machine 20 by a CPU, a memory, a program loaded into the memory, and the like, and FIG. 2 shows functional blocks realized by the cooperation of them. The program may be installed in the game machine 20, or may be provided from the outside in the form of a recording medium having stored the program. Therefore, one skilled in the art understands that these functional blocks are realized in various forms by only hardware, only software, or combinations thereof. When the communication function by the control section 22 is installed in the communication module 24 as one of the functions thereof, the program may be installed in the communication module 24, namely, the master.

The plurality of communication modules 24 substantially have the same communication ability, and wireless communication ranges thereof are overlapped with each other. The plurality of communication modules 24 are physically disposed in positions extremely near to each other, as compared with their communication ranges, and their wireless communication ranges may be substantially the same. Accordingly, in the game system 1, the wireless controller 10 exiting in the communication range of the communication module 24a also exists in the communication range of the communication module 24b so that the wireless controller 10 is connectable to one of the communication module 24a and the communication module 24b. The control section 22 is separate from the communication modules 24 as shown in the drawing. The control section 22, however, may be installed in the function of one communication module 24, to control the communication of the other communication module 24.

The communication modules 24 may be installed in a housing of the game machine 20, or may be connected to the game machine 20 from outside. In the latter case, the game machine 20 has at least one attachment section for attaching the communication modules 24, and the control section 22 controls the communication of at least one communication module 24 when the communication module 24 is attached to the attachment section. All communication modules 24 may be installed in the housing of the game machine 20. Otherwise, part of the communication modules 24 or all communication modules 24 may be connected to the control section 22 via the attachment sections. The game machine 20, for example, may contain the single communication module 24 in its housing when being shipped, and furthermore, may have the one or more attachment sections, through which the communication modules can be added. When all communication modules 24 are connected through the attachment sections, the control section 22 may be installed in a housing of an adapter, which contains any or all of the communication modules 24.

In this embodiment, the control section 22 controls the frequency hopping of at least one communication module 24. Though details will be described later on, the control section 22 determines a frequency channel of at least one of the communication modules 24. To be more specific, in this embodiment, the control section 22 controls the frequency hopping of at least one of the communication modules 24 so that two or more communication modules 24 do not use the same frequency channel simultaneously. It is preferable that two or more communication modules 24 do not use the same frequency channel simultaneously, but such a configuration may not always be required. In that case, the control section 22 may determine the frequency channel, on which at least one communication module 24 hops, so that the collision probability of signals is lower than that in a case where the plurality of communication modules 24 carry out the frequency hopping without being controlled. In the case of Japan, when the two communication modules 24 exist in a certain environment, the control section 22 controls the frequency hopping of one of the communication modules 24 so as to reduce the collision probability less than 1/79th. Thus, in an environment in which the plurality of communication modules 24 exist and communication has to be carried out once every 1/60 second, it is possible to realize stable communication, as compared with a case where each communication module 24 randomly carries out communication by its own hopping pattern.

Figure 3:
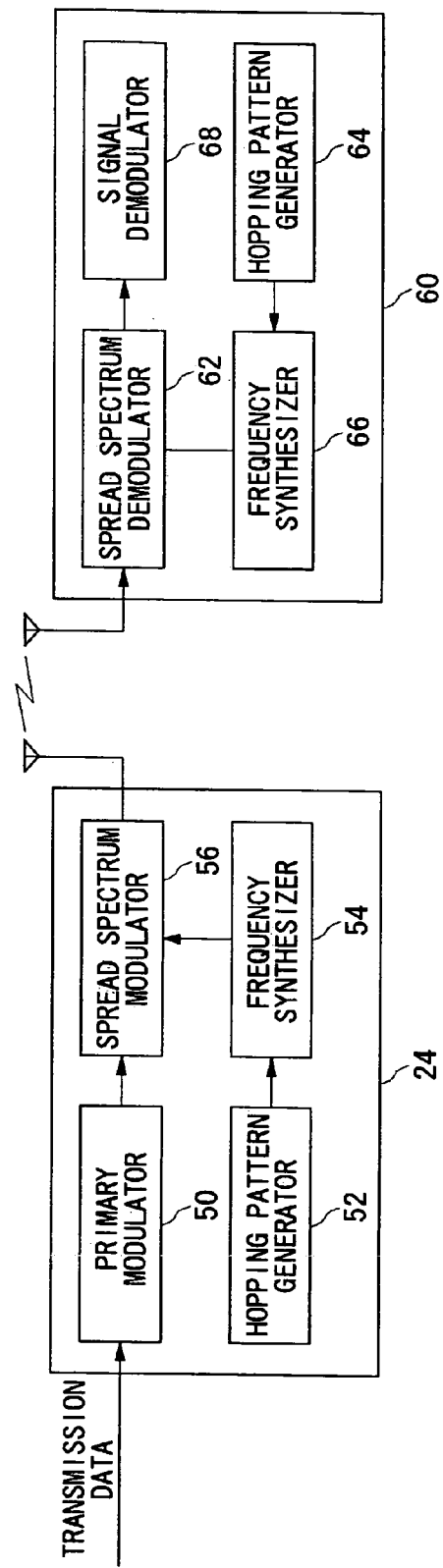
FIG. 3 is a drawing showing an example of the configuration for carrying out communication by frequency hopping spread spectrum in the game system.

FIG. 3 shows an example of the configuration for carrying out communication by the frequency hopping spread spectrum in the game system 1. For convenience of explanation, a configuration as a sender is shown as the communication module 24 of the game machine 20, and a configuration as a receiver is shown as a communication module 60 of the wireless controller 10. As a matter of course, however, the game machine 20 and the wireless controller 10 have both the configurations of the sender and the receiver.

In the communication module 24 of the sender, transmission data is sent from the control section 22, and a primary modulator 50 primarily modulates a data signal by PSK or the like. A hopping pattern generator 52 generally generates a PN (pseudo noise) series of spread spectrum code, and a frequency synthesizer 54 switches carrier frequencies, that is, the frequency channels at regular intervals in accordance with the spread spectrum code. The hopping pattern, which is a cyclic pattern with a predetermined interval, indicates an order of switching the frequency channels. A spread spectrum modulator 56 modulates the frequency of a primary modulation signal in accordance with output from the frequency synthesizer 54. Switching (hopping) the frequency channels of the data signal in accordance with the spread spectrum code makes it possible to realize a spread spectrum modulation method which uses a wider occupied frequency bandwidth than a base bandwidth of the data signal.

In the communication module 60 of the receiver, a hopping pattern generator 64 generates the same spread spectrum code as that of the sender, and a frequency synthesizer 66 switches frequency channels at regular intervals in accordance with the spread spectrum code. A spread spectrum demodulator 62 converts the frequency of a received signal to carry out spread spectrum demodulation, by synchronizing phases of the hopping patterns of the receiver and the sender, and making a carrier frequency output from the frequency synthesizer 66 equal to the carrier frequency of the received signal. A signal demodulator 68 demodulates the received signal which is subjected to the spread spectrum demodulation.

The frequency synthesizer 54 may use a DDS circuit. The DDS circuit varies a frequency in accordance with a digital signal. Taking a case where the hopping pattern generator 52 outputs a PN code, for example, the DDS circuit may serial-parallel convert the PN code so that a frequency is determined. This serial-parallel conversion is carried out by successively assigning bits input in series to lower-order bits, in order of being input. In the case of a serial input signal of "1011010," a signal input into the DDS circuit in parallel is "0101101". This parallel input signal is processed as 7-bit data expressing a binary number. A value of the binary number "0101101" is equal to a decimal number "45", and therefore, a frequency output from the DDS circuit becomes 45 MHz, according to the simplest example.

In the Bluetooth, of Bluetooth addresses which a master uniquely has, a LAP (lower address part) of 24 bits and an UAP (upper address part) of 4 bits, that is, 28 bits in total are used as the spread spectrum code. The frequency synthesizer 54 determines and outputs a frequency on the basis of the sum of a Bluetooth clock and a phase offset. A hopping pattern is determined on the basis of the address information of the master so that the hopping pattern generators 52 and 64 can generate the hopping pattern specific to the master.

Returning to FIG. 2, in this embodiment, as described above, each communication module 24 carries out wireless communication with the wireless controllers 10 by the frequency hopping. Each communication module 24 can generate the specific hopping pattern as the master. When the hopping patterns are used without being controlled, the collision of transmission signal may occur if the same frequency channel is used in two or more masters. Thus, the control section 22 controls the frequency hopping of at least one master to prevent two or more masters from using the same frequency channel at the same timing. Accordingly, high speed communication is realized in the game system 1 by reducing the number of data retransmission or not carrying out the data retransmission, and hence it is possible to improve the reaction speed of the game. The communication module 24a will be hereinafter called a "master A," and the communication module 24b will be called a "master B."

Figure 4A:
FIG. 4A is a drawing showing a frequency band (2402 MHz to 2480 MHz) in Bluetooth.

FIG. 4A shows a frequency band (2402 MHz to 2480 MHz) assigned to the frequency hopping in the Bluetooth. In the Bluetooth, the frequency band of 2.4 GHz is divided into 79 frequency channels every 1 MHz, and communication is carried out by switching the channels for 1600 times per second.

Figure 4B:
FIG. 4B is a drawing showing a state in which the frequency band is divided in two.

FIG. 4B shows a state in which the frequency band is divided in two. In a first embodiment, the control section 22 divides the frequency band of 2.4 GHz in two, one of which is for the master A and the other is for the master B. The control section 22 assigns a divided frequency band of 2402 MHz to 2440 MHz to the master A, and assigns a divided frequency band of 2441 MHz to 2480 MHz to the master B. In this example, 39 frequency channels are set for the master A, and 40 frequency channels are set for the master B. Since the master A and the master B carry out the frequency hopping in the divided different frequency bands, frequencies used by a piconet to which the master A belongs and a piconet to which the master B belongs do not overlap. Therefore, it is possible to prevent the collision of transmission signals.

Figure 4C:
FIG. 4C is a drawing showing a state in which the frequency band is divided into quarters.

FIG. 4C shows a state in which the frequency band is divided into quarters. The control section 22 assigns a frequency band of 2402 MHz to 2421 MHz and a frequency band of 2441 MHz to 2460 MHz to the master A, and assigns a frequency band of 2422 MHz to 2440 MHz and a frequency band of 2461 MHz to 2480 MHz to the master B. In this example, the frequency band is divided into a number which is larger than the number of the masters, and a plurality of divided frequency bands are assigned to each master. The number of dividing the frequency band may be three, or may be five or more. The 79 frequency channels, for example, may be alternatively assigned to the master A and the master B, according to odd-numbered channels and even-numbered channels. In such a case, the frequency band is tantamount to being divided into 79.

Figure 4D:
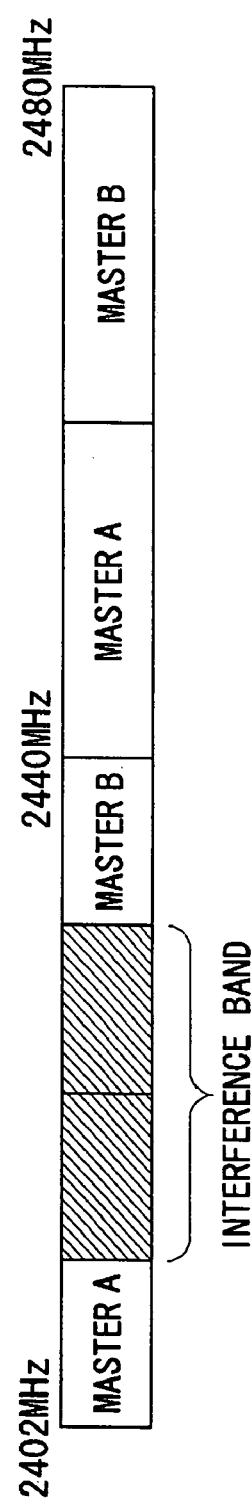
FIG. 4D is drawing showing a state in which inference occurs by a signal from other equipment.

FIG. 4D shows a state in which interference occurs by a signal from other equipment in the frequency band shown in FIG. 4C. This state corresponds to a state in which a signal frequency used by the equipment other than the Bluetooth overlaps with part of the frequency band. In an example of the drawing, part of the frequency bands from 2402 MHz to 2440 MHz become an interference band. If communication is carried out in this interference band, the probability of occurrence of communication failure is high as a matter of course. In general, in a case that the communication failure occurs in the frequency hopping spread spectrum, retransmitting process would be carried out. During the operation of an application requiring real-time communication, however, the retransmitting process impairs the speed of communication. Thus, when the existence of the interference band is found out, it is preferable to carry out communication by use of a frequency band other than the interference band. For example, the control section 22 may check up on signal interference in the frequency band by scanning, before assigning the frequency band to each master.

In the case where the frequency band is divided to be assigned to each master after the interference band is found out, the control section 22 may divide a frequency band, from which the interference band has already been excluded, into plural. In the case where the existence of the interference band is recognized under a condition that the frequency band has been already divided and assigned to each master, on the other hand, the control section 22 needs to reset the frequency band by excluding the frequencies of the interference band. The latter case corresponds to a case where other equipment starts communication in the same environment where the communication module 24 has already started communication and the both communication areas are overlapped. In such a case, subdividing the frequency band into many frequency bands in advance, as shown in FIG. 4D, makes it possible to reduce the possibility of occurrence of difference in the width of the frequency bands assigned to each master. Taking a case where the interference band occurs between 2402 MHz and 2440 MHz, if the frequency band is divided in two as shown in FIG. 4B, the band used by the master A is significantly reduced. If the frequency band is divided into quarters as shown in FIG. 4D, however, the band width used by the master A and the band width used by the master B result in being approximately even, so that this is preferable to realize stable communication.

According to the first embodiment, as described above, the control section 22 divides the frequency band, and assigns the divided different frequency bands to each master and corresponding slaves as frequency bands used by the master and the slaves in the frequency hopping. Thus, it is possible to prevent the collision of signals between the piconets, and to realize real-time signal transmission. This embodiment is on the precondition that there are two masters, but the frequency band is similarly divided if three or more masters exist. To be more specific, when there are three masters, the 79 channels may be divided into three, that is, 26 channels, 26 channels, and 27 channels. When there are four masters, the 79 channels may be divided into quarters, that is, 19 channels, 20 channels, 20 channels, and 20 channels. Each master generates a hopping pattern within a range of assigned frequency channels, and carries out wireless communication by the frequency hopping. When a lower limit of the number of hopping, that is, a lower limit of the number of frequency channels is determined, the frequency band is divided so as to satisfy the lower limit.

In a second embodiment, a hopping pattern used by at least one master is generated on the basis of a reference hopping pattern or a reference spread spectrum code. In this embodiment, the other masters also use the hopping pattern whose phase is shifted with respect to the hopping pattern used by the one master. Since the single hopping pattern is used by shifting its phase, communication frequencies used in the respective piconets do not temporally overlap with each other, and hence it is possible to prevent the collision of signals.

Figure 5:
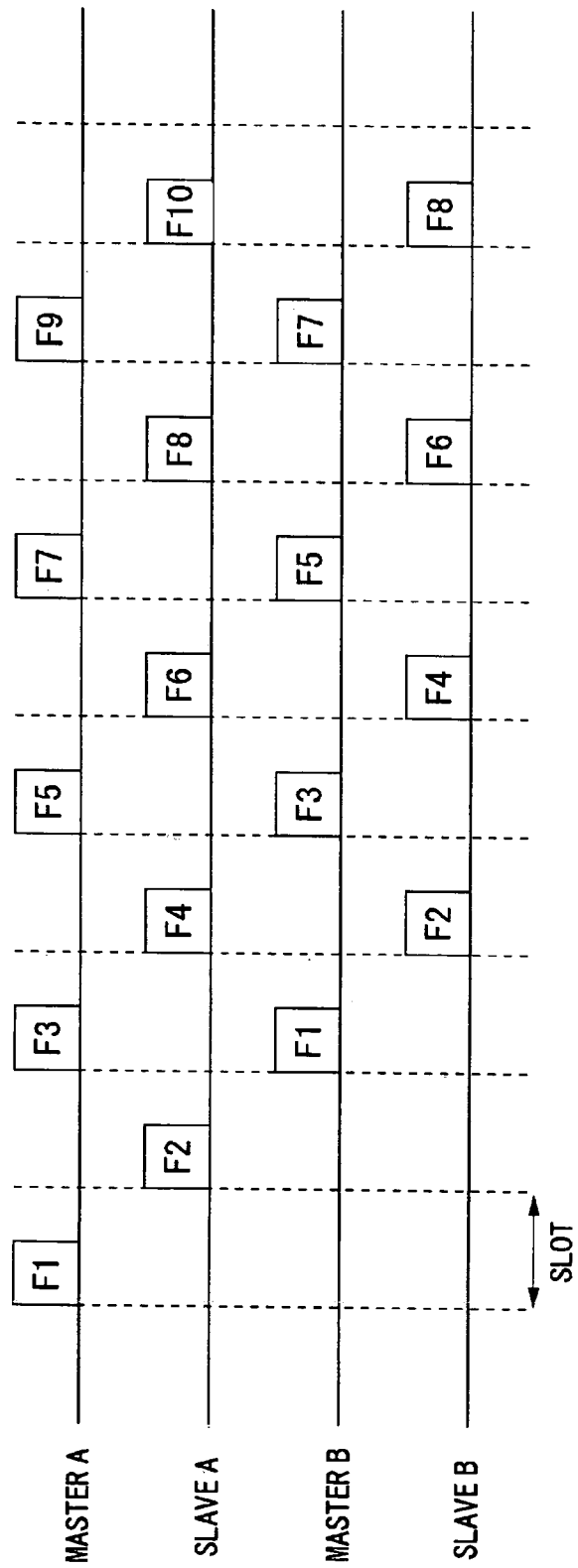
FIG. 5 is a drawing showing a hopping sequence.

FIG. 5 shows a hopping sequence used by each piconet. This drawing takes a case where a master A communicates with a slave A and a master B communicates with a slave B as an example. The master A generates a hopping pattern on the basis of its own address information, and the slave A also generates a hopping pattern on the basis of the address information of the master A. In the second embodiment, this hopping pattern is called a reference hopping pattern. The control section 22 informs the master B of the address information of the master A.

The master B generates a hopping pattern on the basis of the address information of the master A. The generated hopping pattern is the same as the reference hopping pattern. In other words, the address information of the master A is a spread spectrum code common to the master A and the master B. The master B informs the slave B of the address information of the master A, and the slave B also generates the reference hopping pattern on the basis of the address information of the master A. Each master and the associated slave connected to the master have the common reference hopping pattern, as described above.

The mater B uses a hopping pattern whose phase is shifted from the reference hopping, pattern, so as to prevent the hopping pattern from overlapping with the reference hopping patter used by the master A in time. In an example shown in FIG. 5, the master B delays the phase of the reference hopping pattern by two slots with respect to that of the master A. The control section 22 sets the amount of delay shorter than one period of the hopping pattern, and the master B delays the phase of the reference hopping pattern on the basis of the amount of delay informed from the control section 22. The master B itself may already have the amount of delay. Since each master and each associated slave use the same hopping pattern by shifting its phase, as described above, it is possible to prevent the overlap of used communication frequencies. The master B may generate the hopping pattern on the basis of the address information from the master A, but may receive the hopping pattern generated by the master A through the control section 22. The master A informs the master B of hopping start timing through the control section 22, so that it is possible to realize the frequency hopping, the phases of which are shifted to each other.

In a third embodiment, a hopping pattern used by at least one master is generated on the basis of a reference hopping pattern or a reference spread spectrum code. In this embodiment, the hopping pattern used by one master is set as a reference, and the other masters use hopping patterns which are obtained by offsetting the reference hopping pattern by predetermined frequencies. The amount of offset is set to the extent that interference with the reference hopping pattern does not occur, and the amount of offset is 1 MHz or more in the case of the Bluetooth. By using the reference hopping pattern and the hopping patterns whose frequency bands are offset by the predetermined amounts from the reference hopping pattern, communication frequencies used in the respective piconets do not overlap with each other, so that it is possible to prevent the collision of signals.

Figure 6:
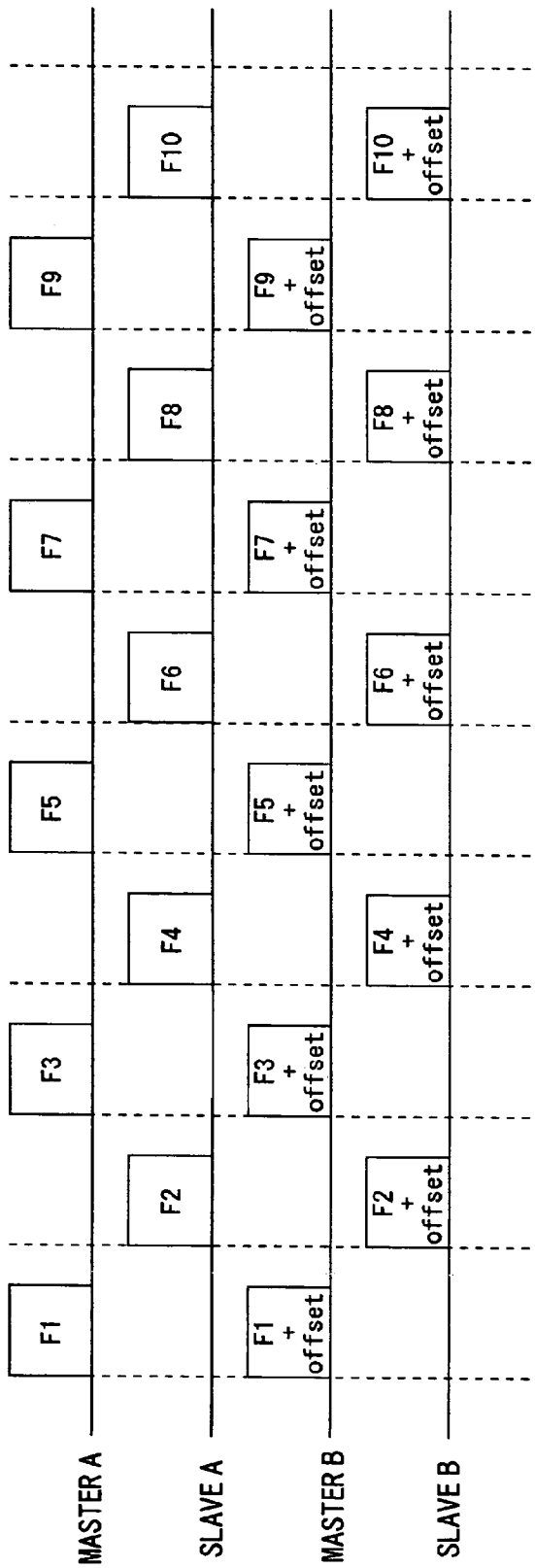
FIG. 6 is a drawing showing another hopping sequence.

FIG. 6 shows a hopping sequence used in each piconet. FIG. 6, as in the case of FIG. 5, takes a case where a master A communicates with a slave A and a master B communicates with a slave B as an example. The master A generates a hopping pattern on the basis of its own address information, and the slave A also generates a hopping pattern on the basis of the address information of the master A. This hopping pattern is called a reference hopping pattern. The control section 22 informs the master B of the address information of the master A.

The master B generates a hopping pattern on the basis of the address information of the master A. This hopping pattern is the same as the reference hopping pattern. Then, the master B offsets the reference hopping pattern by the predetermined amount of frequencies. The master B uses the offset reference hopping pattern as its own hopping pattern. The master B informs the slave B of the address information of the master A and the amount of offset. The slave B also generates the reference hopping pattern on the basis of the address information of the master A, and offsets the reference hopping pattern by the predetermined amount. In such a manner, each master and the associated slave connected to the master have the hopping pattern which does not temporally overlap with others.

The master B uses the offset reference hopping pattern while the master A uses the reference hopping pattern in a manner that the timing when the master A uses the reference hopping pattern and the timing when the master B uses the offset reference hopping pattern are synchronized with each other and thereby the same frequency channel is not utilized simultaneously by the master A and the master B. The amount of offset is set by the control section 22, and the master B is informed of the amount of offset. Otherwise, the master B may have the amount of offset in advance. Since the master B uses the reference hopping pattern by offsetting it by the predetermined amount, as described above, it is possible to prevent the overlap of used communication frequencies. The master B may generate the hopping pattern on the basis of the address information from the master A, but may receive the hopping pattern generated by the master A through the control section 22. When a communication frequency in the hopping pattern, to which the amount of offset is added, goes out of a used frequency band, the communication frequency is corrected so as to fit in the frequency band.

A lower limit and an upper limit of a frequency channel are represented by $F_{min}$ and $F_{max}$, respectively, and the amount of offset is represented by $F_{off}$ ($0<F_{off}$). When a value ($F+F_{off}$) which is the sum of the frequency channel F ($F_{min} \leq F \leq F_{max}$) and the amount of offset $F_{off}$ is equal to or smaller than $F_{max}$ ($F+F_{off} \leq F_{max}$), the master B can use a frequency channel of ($F+F_{off}$) When ($F+F_{off}$) is larger than $F_{max}$ ($F+F_{off}>F_{max}$), on the other hand, a carrier frequency is changed into ($F+F_{off}-(F_{max}-F_{min})$) in order to correct the communication frequency so as to fit in the predetermined frequency band. Therefore, when the amount of offset is added to the reference hopping pattern within the predetermined frequency band, it is possible to properly fit the communication frequency in the predetermined frequency band. Also, it is possible to prevent the overlap use of a frequency in the piconets.

In a fourth embodiment, a hopping pattern used by at least one master is generated on the basis of a reference hopping pattern or a spread spectrum code. In this embodiment, one master sets a frequency channel from bit data assigning a frequency channel, that is, the spread spectrum code. The other masters set frequency channels on the basis of bit data, to which the original bit data is inverted. Therefore, communication frequencies used by each master do not overlap at the same timing, and hence it is possible to prevent the collision of signals.

When a parallel signal sequence input into the DDS circuit is "0100101," for example, the hopping frequency becomes 45 MHz as described above. On the other hand, a hopping frequency with respect to inverted bit data "1011010" becomes 82 MHz, so that these hopping frequencies are necessarily different from each other. Inverting the bits of the spread spectrum code, as described above, makes it possible to set frequency channels different from each other in a piconet of a master A and in a piconet of a master B. As in the case of the foregoing embodiments, the master B is informed of the spread spectrum code of the master A through the control section 22, and the master B inverts the bits of the spread spectrum code. This method is also available in environment except of the Bluetooth. When this method is used in the Bluetooth to which 79 channels are assigned in Japan, however, the inverted hopping frequency has to be corrected so as to be properly included in a frequency band.

FIG. 7 shows frequency channels of the two masters in inverting the bits. In this case, the spread spectrum code is represented by sequential three bits of a PN code. The PN code shifts one bit-by-one bit with a lapse of time. FIG. 7A shows a frequency channel of the master A varying with a lapse of time, and FIG. 7B shows a frequency channel of the master B varying with the lapse of time.

As shown in the drawings, by inverting the bits of the spread spectrum code, the frequency channels of the master A and the master B always differ from each other. Therefore, communication frequencies used by the respective masters do not temporally overlap with each other, and hence it is possible to prevent the collision of signals.

Up to this point, the present invention has been described in conjunction with the embodiments thereof. These embodiments are given solely by way of illustration. It will be understood by those skilled in the art that various modifications may be made to combinations of the foregoing components and processes, and all such modified examples are also intended to fall within the scope of the present invention. The embodiments are mainly related to the Bluetooth, but the present invention is not limited thereto. The present invention is applicable to communication environment using the frequency hopping spread spectrum. It is preferable that the present invention be applied to, for example, an AV transmission system requiring high speed. The 79 channels are assigned to the Bluetooth in Japan, but there are countries in which only a few tens channels are assigned thereto. In such countries, the collision of signals could often occur in an environment where there are a plurality of masters, so that the present invention is effectively applied.

In the foregoing embodiments, a hopping pattern is controlled by a master. A slave, however, may control the hopping pattern. For example, the slave sends a hopping pattern change request to the master, and the master gives permission for the request. Upon receiving the permission, the slave sends a new hopping pattern to the master, and the master broadcasts that hopping pattern to the other slaves belonging to its own piconet. Accordingly, it is possible to achieve commonalty of the hopping pattern in the piconet, under the initiative of the slave.

AFH (adaptive frequency hopping) is stipulated in the Bluetooth, and measures for reduction in mutual interference with a system, which does not carry out the frequency hopping, is planed to be adopted. In such a case, the reference hopping pattern in the foregoing embodiments becomes a hopping pattern after the application of the AFH, and therefore, it becomes possible to realize proper frequency hopping on the basis of this reference hopping pattern, as described above.

Furthermore, in the foregoing embodiments, a frequency channel used by each master is properly set. The control section 22, however, may have a plurality of prepared hopping patterns which do not overlap with one another in advance, and provide the hopping patterns to respective masters. The control section 22 may obtain hopping patterns generated by respective masters, and permit each master to use the hopping pattern, when the use of the hopping pattern reduces the collision probability of signals, as compared with a case where the plurality of masters carry out the frequency hopping without being controlled. Ideally, it is preferable that the hopping patterns do not overlap with each other. When the frequency bands of the hopping patterns temporally overlap, each master may be informed of it, and may be commanded to regenerate a new hopping pattern.

What is claimed is:

1. A communication device comprising:
a first master module and a second master module, the first master module and the second master module are capable of a wireless connection to a first slave module and a second slave module, respectively, by frequency hopping spread spectrum; and
a control section which controls frequency hopping of at least one of the master modules, wherein
the first master module generates a first hopping pattern based on a spread spectrum code of the first master module;
the control section informs the second master module of the spread spectrum code of the first master module; and
the second master module generates a second hopping pattern based on the informed spread spectrum code of the first master module by setting a frequency channel determined by bit data obtained by inverting bit data designating a frequency channel of the first hopping pattern.

2. The communication device according to claim 1,
wherein the first master module generates the first hopping pattern by using bit data obtained from the spread spectrum code of the first master module, and
wherein the second master module generates the second hopping pattern by using bit data obtained by inverting bit data of the spread spectrum code of the first master module.

3. A communication device comprising:
a first master module that is capable of wireless connection to a first slave module by frequency hopping spread spectrum;
an attachment section which attaches a second master module that is capable of wireless connection to a second slave module by frequency hopping spread spectrum; and
a control section which controls frequency hopping of at least one of the first master module or the second master module wherein
the first master module generates a first hopping pattern based on a spread spectrum code of the first master module;
the control section informs the second master module of the spread spectrum code of the first master module; and
the second master module generates a second hopping pattern based on the informed spread spectrum code of the first master module by setting a frequency channel determined by bit data obtained by inverting bit data designating a frequency channel of the first hopping pattern.

4. The communication device according to claim 3,
wherein the first master module generates the first hopping pattern by using bit data obtained from the spread spectrum code of the first master module, and
wherein the second master module generates the second hopping pattern by using bit data obtained by inverting bit data of the spread spectrum code of the first master module.

5. A game machine comprising:
a first communication module and a second communication module, the first communication module and the second communication module being capable of wireless connection to a first wireless controller and a second wireless controller, respectively, by frequency hopping spread spectrum; and
a control section which controls frequency hopping of at least one of the first communication module or the second communication module, wherein
the first communication module generates a first hopping pattern based on a spread spectrum code of the first communication module;
the control section informs the second communication module of the spread spectrum code of the first communication module; and
the second communication module generates a second hopping pattern based on the informed spread spectrum code of the first communication module by setting a frequency channel determined by bit data obtained by inverting bit data designating a frequency channel of the first hopping pattern.

6. The game machine according to claim 5,
wherein the first communication module generates the first hopping pattern by using bit data obtained from the spread spectrum code of the first communication module, and
wherein the second communication module generates the second hopping pattern by using bit data obtained by inverting bit data of the spread spectrum code of the first communication module.

7. A game machine comprising:
a first communication module which is capable of wireless connection to a first wireless controller by frequency hopping spread spectrum;
an attachment section which attaches a second communication module which is capable of wireless connection to a second wireless controller by frequency hopping spread spectrum; and
a control section which controls frequency hopping of at least one of the communication modules, wherein the first communication module generates a first hopping pattern based on a spread spectrum code of the first communication module;

the control section informs the second communication module of the spread spectrum code of the first communication module; and the second communication module generates a second hopping pattern based on the informed spread spectrum code of the first communication module by setting a frequency channel determined by bit data obtained by inverting bit data designating a frequency channel of the first hopping pattern.

8. The game machine according to claim 7, wherein the first communication module generates the first hopping pattern by using bit data obtained from the spread spectrum code of the first communication module, and wherein the second communication module generates the second hopping pattern by using bit data obtained by inverting bit data of the spread spectrum code of the first communication module.

9. A method for controlling communication between master modules and slave modules in an environment that includes a first master module and a second master module, the first master module and the second master module being capable of wireless connection to a first slave module and a second slave module, respectively, by frequency hopping spread spectrum, the method comprising:

generating, at the first master module, a first hopping pattern based on a spread spectrum code of the first master module;

informing the second master module of the spread spectrum code of the first master module; and generating, at the second master module, a second hopping pattern based on the informed spread spectrum code of the first master module by setting a frequency channel determined by bit data obtained by inverting bit data designating a frequency channel of the first hopping pattern.

10. A computer program product, comprising a computer usable medium having a computer readable program code embodied therein, said computer readable program code adapted to be executed to implement a method for controlling communication between master modules and slave modules in an environment that includes a first master module and a second master module, the first master module and the second master module being capable of wireless connection to a first slave module and a second slave module, respectively, by frequency hopping spread spectrum, the program comprising executable instructions that cause a computer to:

generate, at the first master module, a first hopping pattern based on a spread spectrum code of the first master module;

inform the second master module of the spread spectrum code of the first master module; and generate, at the second master module, a second hopping pattern based on the informed spread spectrum code of the first master module by setting a frequency channel determined by bit data obtained by inverting bit data designating a frequency channel of the first hopping pattern.

* * * * *

UNITED STATES PATENT AND TRADEMARK OFFICE
CERTIFICATE OF CORRECTION

PATENT NO. : 7,620,372 B2  Page 1 of 1
APPLICATION NO. : 10/983212
DATED : November 17, 2009
INVENTOR(S) : Yoshio Miyazaki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 647 days.

Signed and Sealed this

Fourteenth Day of December, 2010

David J. Kappos
*Director of the United States Patent and Trademark Office*